[104.] MARY ANN BOUGHTON.

Sheet 1, 2 Sheets.

Improvement in Cooking Stoves.

No. 4,568.

Reissued Sep. 26, 1871.

Attest; Jno. B. Hard
Thos. McIlvain

Inventor:
Mary Ann Boughton
By her attys
Howson & Son

AM. PHOTO-LITHOGRAPHIC CO. N.Y. (OSBORNE'S PROCESS.)

[104.]

Sheet 2. 2 Sheets.

MARY ANN BOUGHTON.

Improvement in Cooking Stoves.

No. 4,568. Reissued Sep. 26, 1871.

Attest; Jas. B. Harding
Thos. McIlwain Jr.

Inventor:
Mary Ann Boughton
By her Attys
Hanson & Co

AM. PHOTO-LITHOGRAPHIC CO. N.Y. (OSBORNE'S PROCESS.)

UNITED STATES PATENT OFFICE.

MARY ANN BOUGHTON, OF NORWALK, CONNECTICUT.

IMPROVEMENT IN COOKING-STOVES.

Specification forming part of Letters Patent No. 113,842, dated April 18, 1871; reissue No. 4,568, dated September 26, 1871.

*To all whom it may concern:*

Be it known that I, MARY ANN BOUGHTON, of Norwalk, in the county of Fairfield, State of Connecticut, have invented certain Improvements in Cooking-Stoves, of which the following is a specification:

My invention consists of certain improvments in cooking-stoves, too fully explained hereafter to need preliminary explanation, the main object of the said improvements being to obtain a thorough circulation of the heated products of combustion around the oven without interfering with the draught.

Figure 1:
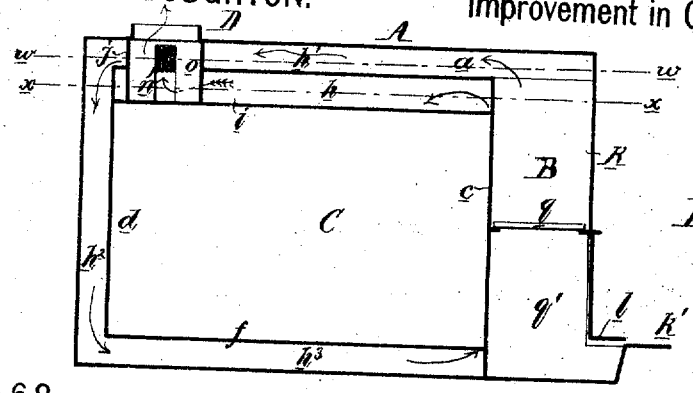
Figure 3:
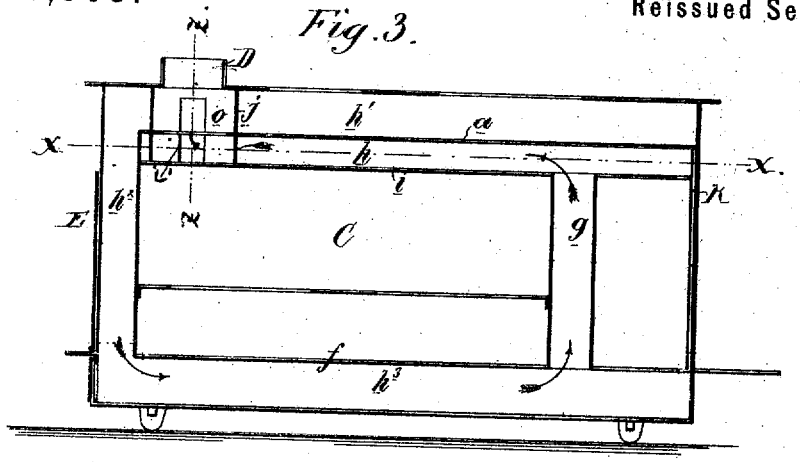
Figure 2:
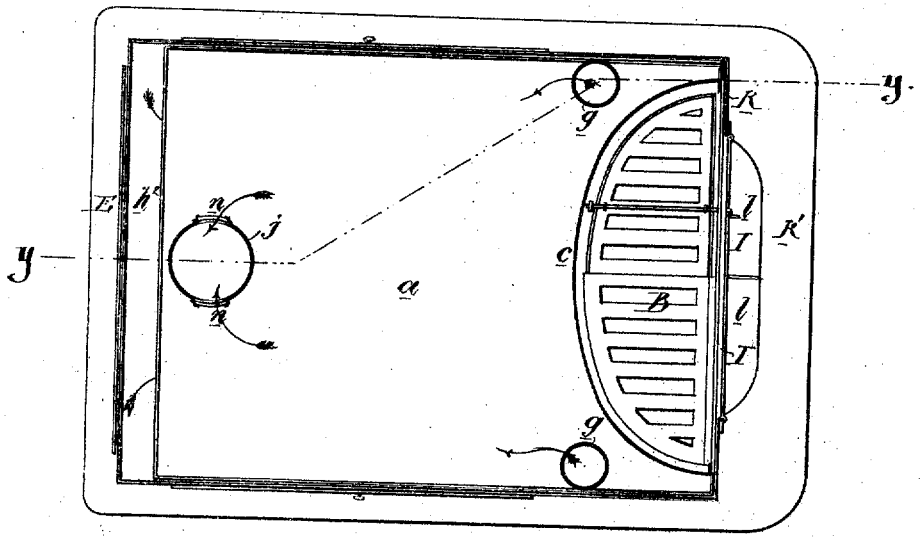
Figure 4:
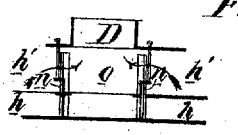
Figure 5:
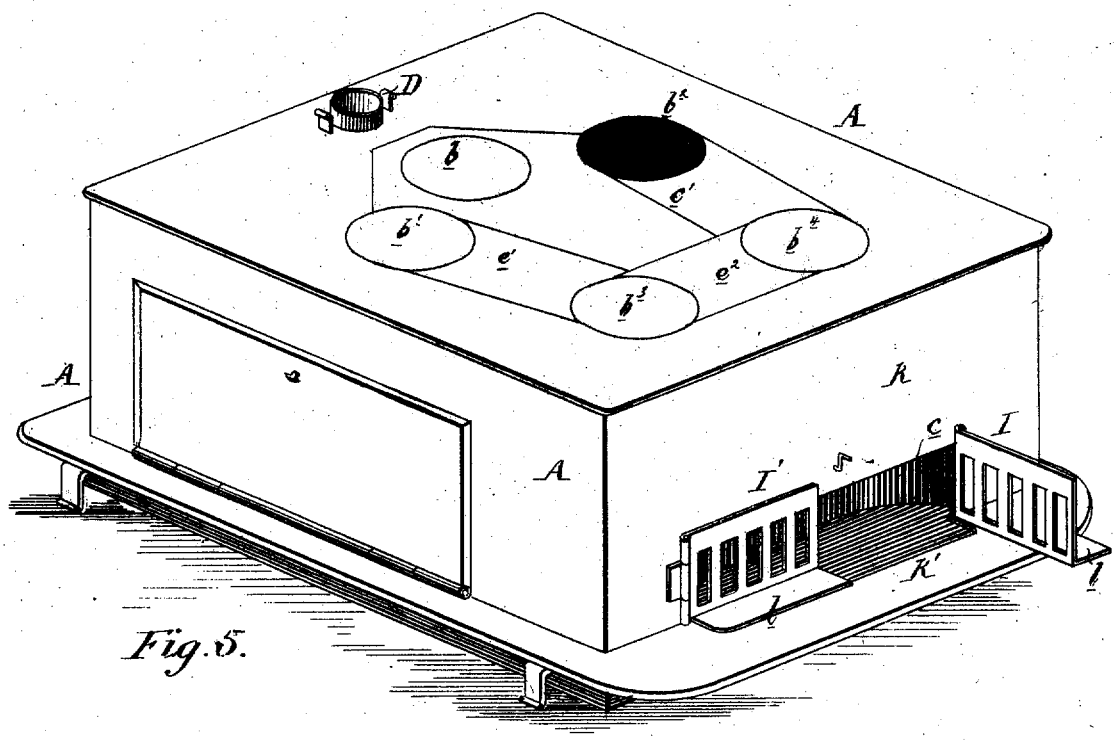
Figure 6:
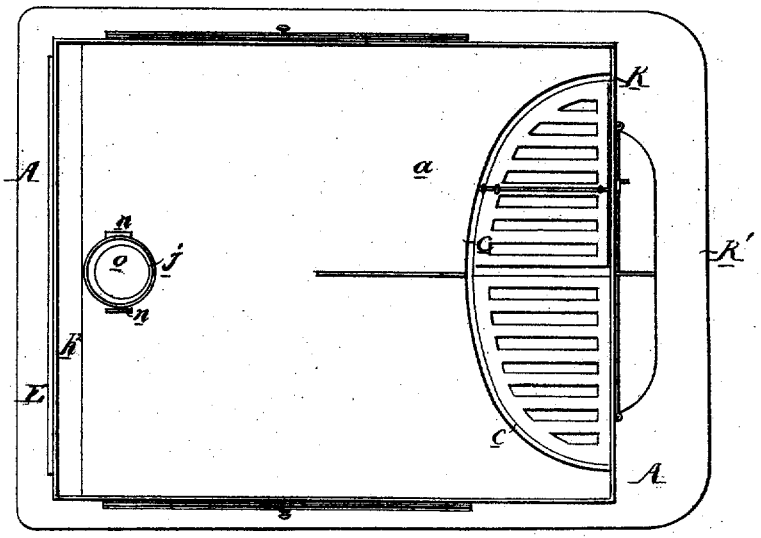

Figure 1, Sheet 1, is a sectional elevation, through the center, of my improved cook-stove; Fig. 2, a sectional plan on the line *x x*, Fig. 1; Fig. 3, a sectional elevation on the line *y y*, Fig. 2; Fig. 4, a detached section on the line *z z*, Fig. 3; Fig. 5, Sheet 2, a perspective view; and Fig. 6, a sectional plan on the line *w w*, Fig. 1.

The outer casing A of the above is oblong and rectangular, and has at the top boiler-holes $b$ $b^1$ $b^2$ $b^3$ $b^4$, arranged as shown in Fig. 5, there being detachable cross-pieces $e$ $e^1$ between the holes $b^1$ $b^3$ $b^2$ $b^4$, and a similar cross-piece, $e^2$, between the holes $b^3$ $b^4$. The interior of the casing is divided by parallel horizontal plates $a$ $i$ $f$ and vertical plates $c$ $d$, so as to form two chambers, B and C, three horizontal flues, $h$ $h^1$ $h^3$, and a vertical flue, $h^2$, all of the said flues extending entirely across the width of the stove. The chamber C is the oven, and has at both sides suitable doors, and the chamber B is divided by a horizontal grate into the fire-place $q$ and ash-pit $q'$. In the front plate K, below the grate, is an opening which coincides with a similar opening in the projecting hearth-plate $k'$, and to the plate $k$ are hung doors I I′, which close the opening in the front plate and have at their lower edges flanges $l$ $l$, which, when the doors are closed, cover the opening in the hearth-plate. The plate $c$, which forms the back of the ash-pit and fire-chamber, extends from the base-plate of the stove to the plate $a$ and is curved so that both ends bear against the front plate $k$, the plate $a$ being cut away so that the fire-chamber communicates directly with the flue $h'$. The exit-opening D is surrounded by the usual flange and is arranged in front of the back-plate $d$ of the oven, and communicates with a short cylindrical flue, $o$, formed by a tube, $i'$, extending from the plate $i$ to the upper plate of the stove; and in the sides of this tube are openings to which are fitted slides $n$ $n$, with operating-rods or strips extending through and above the upper stove-plate, Fig. 4. From the plate $f$ to the plate $i$, near the front and adjacent to each side of the stove, extend two tubes, $g$ $g$, which form communications between the lower flue $h^3$ and the flue $h$. To the rear plate of the stove is hinged a plate, E, which may be turned down to a horizontal position, forming a shelf upon which to place cooking-utensils the contents of which are to be kept in a warm state; or it may be turned up against the rear plate, out of the way, when not in use, as shown in Fig. 3.

When a fire is first kindled in the stove the slides $n$ $n$ are depressed, as shown in Fig. 4, so as to open a communication between the flue $h^1$ and the exit-opening D for the passage of the heated gases directly to the exit-opening from the said flue. After the fire has begun to burn freely and emits but little smoke the slides $n$ $n$ are raised, when the heated gases will pass down the flue $h^2$, along the bottom flue $h^3$, upward through the tubes $g$ $g$ to the flue $h$, and along the latter through the openings $n$ $n$ to the exit-pipe. It will be seen that, instead of passing first to one side of the stove then to the other, or of passing through corner or central flues, the heated gases pass in an unbroken stream the complete width of the stove, in contact with the entire surface of every plate which they traverse, so that the said plates are heated uniformly, instead of all the heat being concentrated at the center or at one or both sides, as usual, while, owing to the absence of all guiding-plates in the flues, the draught is not in the least obstructed. This is a matter of much importance, especially with the cheaper kinds of stoves, which generally have to be used where the chimneys are small and low and the draught defective. In some stoves the draught is reversed at the top—that is, the gases, after passing over the plate $a$, are brought back between the plate and the top of the oven. This not only obstructs the draught, but it also concentrates the greater part of the heat at the top of the stove and prevents the proper heating of the other parts. This is avoided by my improvement. Owing to the arrangement of the tubes $g$ $g$ in respect to the flues, the gases are passed in contact with the oven-plates before passing through the said flues, every plate of the oven being thus uniformly heated before the stream of gases is divided, while the radiation of heat from the rear side of the fire-pot is in no way obstructed.

By arranging a tubular flue with side openings directly beneath the exit-opening and in front of the back plate *d* of the oven the usual horizontal valves and dampers may be dispensed with, the dividing of the rear flue and the obstruction of all the flues being thus avoided. By forming the flanges *t t* on the front doors I I′ the necessity of providing a detachable lid for the opening in the hearth-plate is avoided.

Without confining myself to the precise construction and arrangement of parts shown and described, I claim—

1. The combination, in a cook-stove, of an oven, a fire-place, and tubes *g g* arranged wholly within the oven, as described, and communicating with the flues, as set forth, so as to conduct the gases through the oven after they have passed round three sides thereof, as set forth.

2. A cook-stove in which the gases pass round three sides of the oven without being reversed, and without being divided except at the point over the upper plate where the exit-flue is situated, as set forth.

3. The combination of the exit-opening and the tubular flue communicating therewith and with upper and lower flues *h* and $h^1$, furnished with slides, substantially as specified.

4. The combination with the front plate *k* and recessed hearth-plate *k′* of hinged doors I I′ having flanges *l l*, arranged as specified.

5. A plate, E, hung to the outer casing of a stove so as to be turned to a vertical or horizontal position, substantially as described.

In testimony whereof I have signed my name to this specification in the presence of two subscribing witnesses.

MARY ANN BOUGHTON.

Witnesses:

WM. A. STEEL,

LOUIS BOSWELL.